July 5, 1966     W. H. BIBBENS     3,259,019

METHOD AND APPARATUS FOR MANUFACTURING TOOTHED MACHINE ELEMENTS

Filed July 31, 1964     5 Sheets-Sheet 1

INVENTOR.
WILLIAM H. BIBBENS

ATTORNEY

INVENTOR.
WILLIAM H. BIBBENS
BY
Gregory S. Dolgorukof
ATTORNEY

July 5, 1966 W. H. BIBBENS 3,259,019
METHOD AND APPARATUS FOR MANUFACTURING TOOTHED MACHINE ELEMENTS
Filed July 31, 1964 5 Sheets-Sheet 3

INVENTOR.
WILLIAM H. BIBBENS
BY
Gregory S. Dolgorukov
ATTORNEY

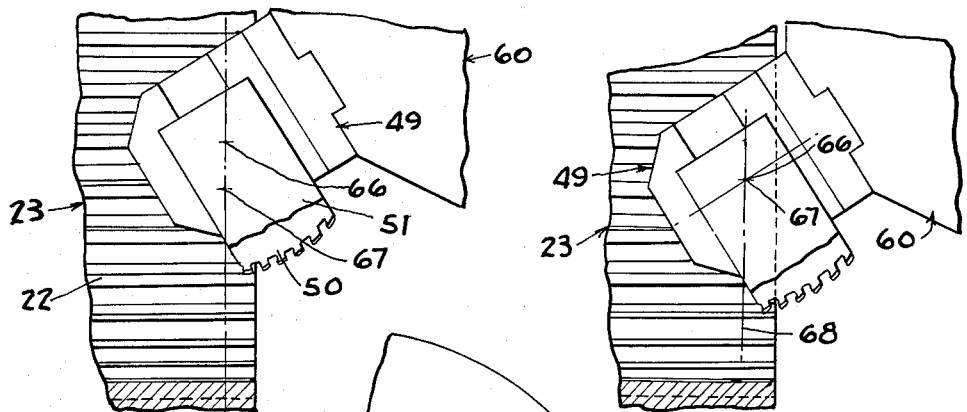
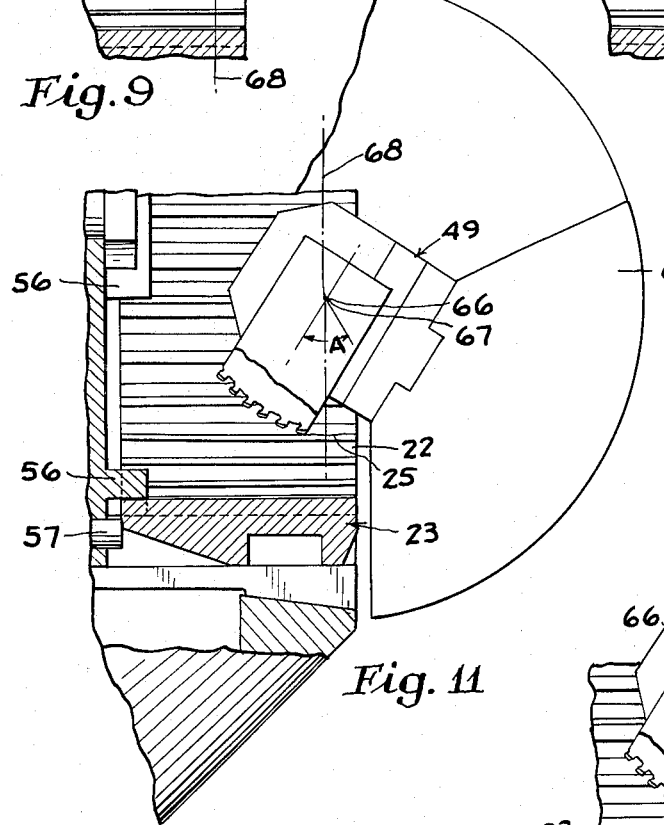
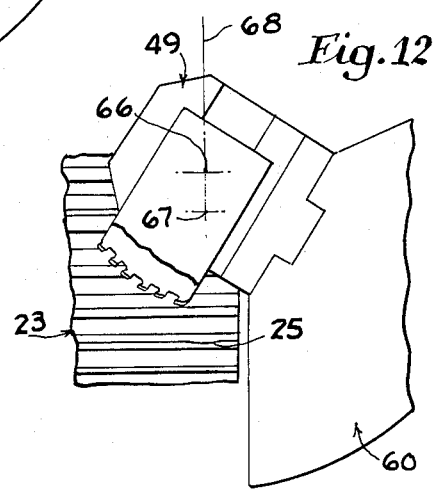
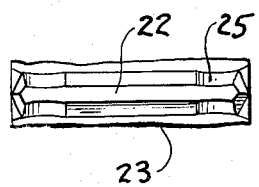
Fig. 9  Fig. 10  Fig. 11  Fig. 12  Fig. 13
INVENTOR.
WILLIAM H. BIBBENS
BY
Gregory S. Dolgorukov
ATTORNEY INVENTOR.
WILLIAM H. BIBBENS
BY
Gregory S. Dolgorukov
ATTORNEY

United States Patent Office 3,259,019
Patented July 5, 1966

3,259,019
METHOD AND APPARATUS FOR MANUFACTURING TOOTHED MACHINE ELEMENTS
William H. Bibbens, Birmingham, Mich.
(14230 Birwood Ave., Detroit, Mich.)
Filed July 31, 1964, Ser. No. 386,506
9 Claims. (Cl. 90—1.4)

This invention relates to an improved method and apparatus for producing recesses or reliefs in the side or working faces of teeth of toothed machine elements or members, such, for instance, as gears and splines, and more particularly but not exclusively to such method and apparatus intended to machine arcuate recesses in the side or working faces of the teeth of such elements for the purposes disclosed in my co-pending application, Serial No. 399,373, filed January 22, 1964, for Toothed Members.

Provision of recesses or reliefs in the side or working faces of internal teeth of machine elements to prevent disengagement of such teeth from meshing teeth has been well appreciated in the art. However, cutting or machining such recesses, particularly in the side or working faces of internal teeth of various toothed elements presents a number of exceedingly difficult problems. These problems result primarily from inaccessibility of the side or working faces of internal teeth of such members to conventional cutters, and the difficulty of generating proper configuration of the recesses or reliefs with the use of known methods and conventional apparatus. Configuration of the recess or relief is a factor of prime importance for proper functioning of the meshing members in preventing disengagement of their meshing teeth.

In addition, the prior methods and apparatus devised for such purposes proved to be exceedingly slow, inadequate under many conditions for generating desired recess configurations. In fact, with the use of some conventional methods and apparatus, the recesses produced mutilate the teeth and endanger their strength such as by cutting deeply into the root surfaces of the teeth.

One of the objects of the present invention is to provide an improved method and apparatus whereby the above difficulties and disadvantages are overcome and largely eliminated without introducing new problems or increasing in an appreciable manner the costs involved.

Another object of the present invention is to provide an improved method and apparatus for cutting arcuate recesses in the side or working faces of internal teeth of toothed machine elements, which recesses do not extend into the body of the toothed element at the root surfaces of the teeth, and the curvature of which is accurate, is in accordance with the predetermined design and is not changed or distored by the path of the cutter.

A further object of the present invention is to provide an improved method and apparatus of the above nature which insures production of accurate spline locking recesses without generating secondary burrs or causing tooth distortion.

A still further object of the present invention is to provide an improved machine for cutting arcuate recesses in the working faces of internal teeth of toothed machine elements, which machine is made substantially universal over relatively wide ranges of diameters of internal toothed members merely by changing the tooling to adapt it to a specific workpiece, and by having machine stops suitably adjusted.

A still further object of the present invention is to provide an improved machine of the nature specified in the preceding character in which loading and unloading of the workpiece is simple, does not result in operator fatigue and affords effective disposal of chips.

A still further object of the present invention is to provide a machine of the foregoing nature, which includes an improved collet or chuck assembly adapted to receive the workpiece, to locate it both in axial direction and in radial direction, to hold it securely in its position in the process of cutting, and to index the workpiece in a manner to insure completion of the entire recess cutting operation.

A still further object of the present invention is to provide an improved machine of the foregoing nature, which includes cutting means adapted to cut in a single stroke recesses in two separate tooth working faces and which complete cutting of recesses in all of the teeth of the members by cutting strokes the number of which is equal to the number of the teeth in the workpiece.

A still further object of the present invention is to provide a machine of the foregoing nature, which includes cutter means actuated in such a manner that in the process of one cutting cycle, the cutting means are brought into the starting or cutting position, moved through the cutting stroke, are withdrawn from the position of their interference with indexing and are moved through the return stroke within the toothed workpiece while said workpiece is being indexed without interference from the cutting means, and are moved again to the starting position to repeat the cycle.

A still further object of the present invention is to provide an improved machine in the nature specified above in which the collet or chuck means are brought into the workpiece loading position, ready to receive the workpiece and which, upon receipt of the workpiece, clamp the workpiece automatically and proceed to move through the automatic cycle, with automatic indexing of the workpiece through the entire 360 degrees for finishing the cutting operation, whereupon the collet or chuck means are moved away from the cutting means, are returned into the original position for unlocking the finished part, manually unloading the same, and for receiving a new workpiece.

Further objects and advantages of this invention will be apparent from the following description and appended claims, reference being had to the accompanying drawings forming a part of this specification, wherein like reference characters designate corresponding parts in the several views.

FIG. 9 is a view, partly in section, showing the broach unit brought into the operative position at the workpiece and ready to be lowered into the cutting position.

FIG. 10 is a view similar in part to FIG. 9 but showing the broach unit lowered into its cutting position and ready to proceed on its cutting stroke.

FIG. 11 is a view showing the broach unit at the end of its cutting stroke.

FIG. 12 is a view showing the broach unit moved up to clear the teeth of the workpiece for indexing and ready to start on its return movement toward its position illustrated in FIG. 9.

FIG. 13 is a top view of one spline tooth having recesses provided in the working faces thereof at both its ends by the cutting actions illustrated in FIGS. 9–12.

Figure 1:
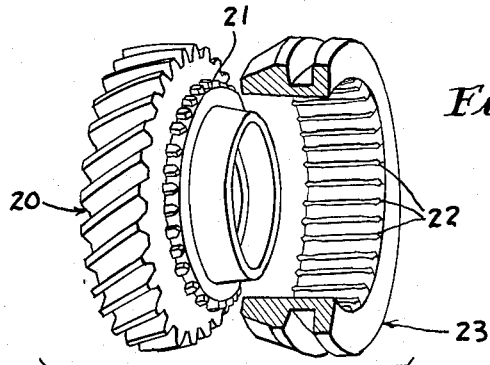
FIG. 1 is an exploded view showing in perspective two toothed members, one of them including external spline teeth and the other including internal spline teeth engageable in operation with said internal splined member representing an exemplary workpiece.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

In the drawings there is shown, by way of example, an apparatus or machine for performing the operation of cutting arcuate recesses in the working faces of internal teeth of an internally splined member, in accordance with the method disclosed herein.

For a proper understanding of the requirements which the method and machine herein disclosed must satisfy, FIGS. 1 illustrates two machine elements or members, depending for their proper operation on the provision of arcuate recesses in the working faces of one of them. One of said members is an external gear 20, including a plurality of external splined teeth 21, and adapted to engage the internal splined teeth 22 of the member 23 at the arcuate recesses 24 provided in the side or working faces of said teeth at the left-hand ends thereof. Similar recesses are provided also in the right-hand ends of said teeth as indicated at 25 for engagement with the external splined teeth of another member (not shown). Thus, the member 23 represents a typical workpiece with reference to which the present invention is hereinafter illustrated and described. The splined portion of the gear 20 and the member 23 may be thought of as forming a tooth clutch device.

Figure 2:
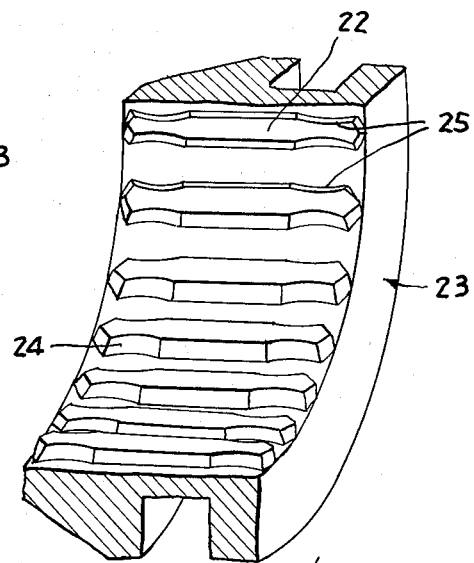
FIG. 2 is a fragmentary exploded view showing a portion of the construction of FIG. 1 on an enlarged scale for the purposes of clarity.
Figure 2:
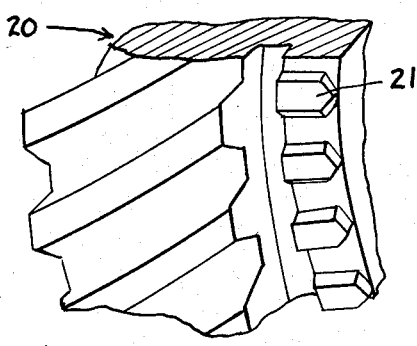

FIG. 2 illustrates a portion of said member 23 on a larger scale, while FIG. 13 shows one tooth separately in a top view for further clarification of the construction.

While said figures show recesses in the working faces at both ends of individual internal spline teeth, it will be understood that the present invention is illustrated and described herein with reference to the provision of arcuate recesses on the ends of the teeth on one side of the internal spline member 23 only, it being understood that the operation of providing such recesses on the opposite ends of the teeth is similar. It will be understood from examination of FIGS. 1, 2, and 13 that the recesses provided in both working faces of the internal teeth are arcuate in shape in the sense that they are represented in sectional views by arcs, and that the surfaces of such recesses are actually approximating portions of cylinders.

In accordance with the present invention, I cut arcuate recesses simultaneously in two working faces of two separate teeth, which faces are the opposite faces. Referring to the lowermost tooth 30 in FIG. 6 for illustrating this particular point, I cut the recesses in the face 31 of said tooth while the workpiece is positioned to have said face 31 on the right-hand side of said member, and cut the face 32 when the same tooth is brought after successive indexing to the left-hand side of said member.

Arcuate recesses are cut by a cutting edge moving along an arc, the radius of which is equal to the radius of the recesses to be cut. Therefore, in order to cut simultaneously two arcuate recesses, I select two teeth the recesses of which would have their axes extended substantially along the same straight line. Furthermore, I bring the cutting edges into such space relation with the workpiece that the axis of the arcuate movement of said edges coincides with the common axis, or nearly common axis, of the recesses to be cut. Thus, the first step of my improved method is to identify two teeth on the two sides of a workpiece, such at 23, the opposite side faces of which lie on approximately the same straight line parallel to the axis of the arcuate recesses to be cut.

Figure 6:
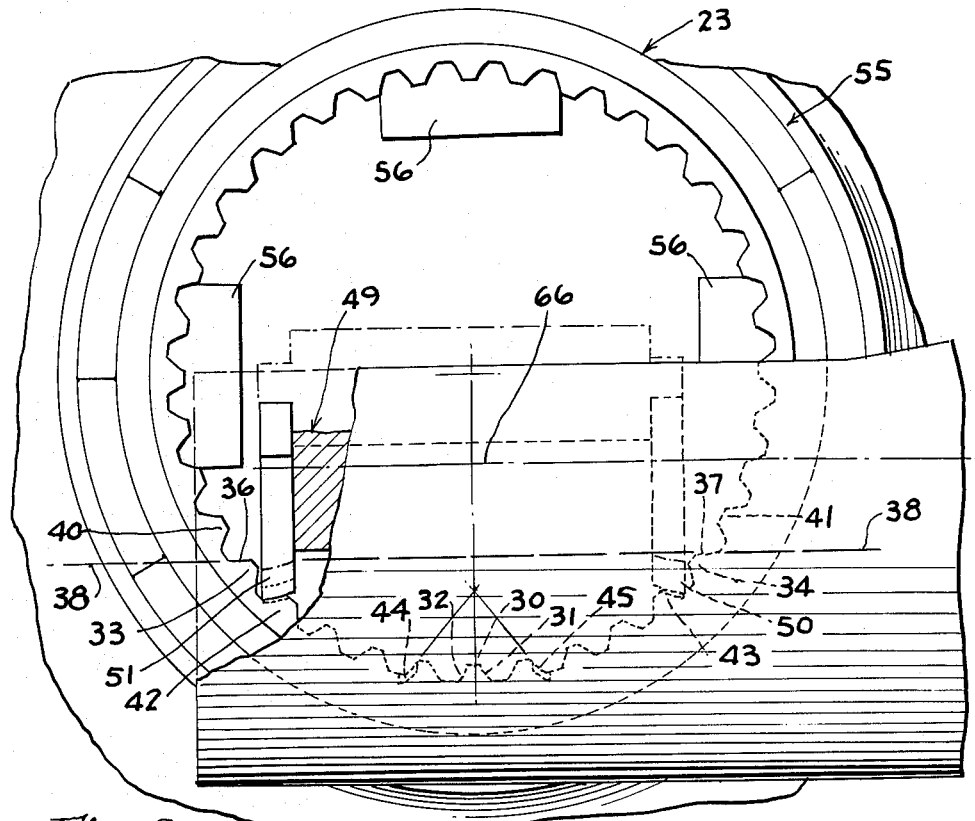
FIG. 6 is an end view of the workpiece held within the collect and with the broach unit disposed in an operative position therein.
Figure 7:
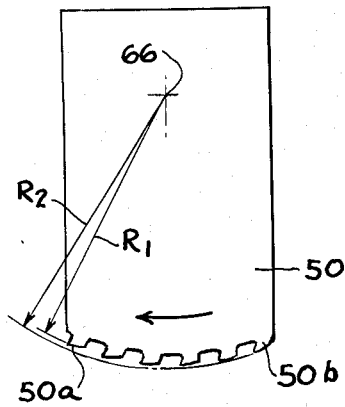
FIG. 7 is a side view of one of the broach cutters illustrating the teeth thereof and the radii of their cutting.

Referring to FIG. 6, teeth in positions 33 and 34, the faces 36 ad 37 whereof lie in a plane passing through the straight line 38, might be an ideal selection if the second requirement explained below would not need to be satisfied. It will be noted that the above numerals designate positions of teeth rather than specific teeth.

This second requirement is that the tops of the adjacent teeth in positions 40 and 41 clear the sides of the broach cutters, the sides of which are perpendicular to the line 38. This is necessary in order to cut recess of the predetermined design in the entire side or working faces of each tooth without interference from the adjacent teeth. Because of such additional requirement, the teeth in positions 42 and 43 are next considered. In these positions the clearance situation becomes much better. However, in such positions the faces in which the recesses are to be cut are now not on a common plane. Yet their selection satisfies in an acceptable manner both of the above explained requirements and therefore is an acceptable selection of teeth positions for machining.

The above described method of selecting teeth positions for simultaneous cutting of two recesses may be stated in a different manner. The selected teeth positions are those which permit the use of the widest possible broach unit, i.e. of the unit with broach cutter spaced at a maximum distance, and yet cut recesses of the predetermined design through the entire width of the working faces of the teeth.

It should be appreciated at this point that should teeth positions such as 44 and 45 be selected for cutting, while the cutter side clearance situation in such positions has improved still further, the recesses produced would deviate detrimentally from the predetermined design and would cut down into the root faces of the teeth creating an objectionable condition.

It will be appreciated further that the teeth of the broach cutters 50 and 51 are shaped to correspond to the configuration and inclination of the faces in which recesses to be cut and that their shape may also be used to improve the configuration of the recesses to be cut and to compensate in some measure for the adverse influences.

It should be also appreciated that in a toothed member having a large number of teeth there may be more than one acceptable possibility of satisfying the above explained requirements, while in a member having a small number of teeth such possibilities may be limited to only few or even one selection. In other words, the greater is the number of teeth in a workpiece, the more of acceptable selections exist, and vice versa. Also, should it be determined that the recesses may be made less deep, this may widen still further the choice of available selections. In other words, decreasing the depth of the recesses increases the number of acceptable selections, and vice versa.

Figures 5, 5B:
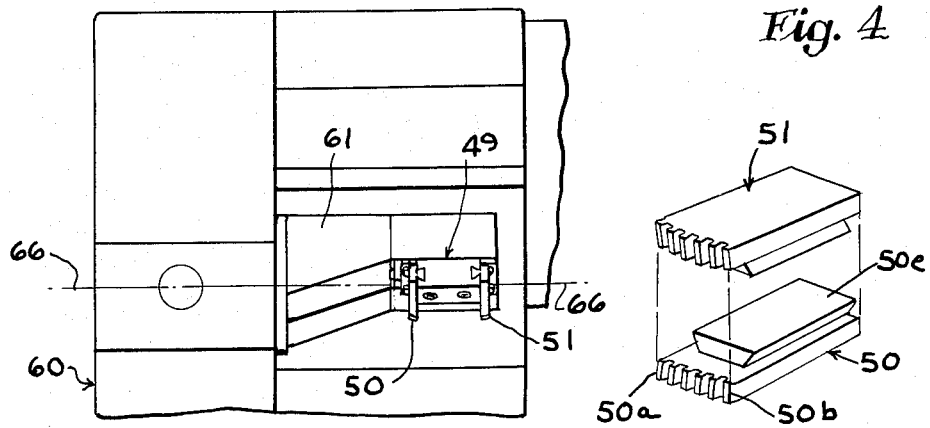
FIG. 5 is a sectional view taken in the direction of the arrows on the section plane passed through the section line 5—5 of FIG. 4.
FIG. 5b is an exploded view showing the broach cutters separately but in the space relationship corresponding to that which they have in their operative positions in the broach unit.
Figure 5A:
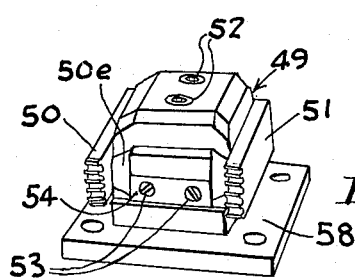
FIG. 5a is a perspective view showing the broach unit or assembly separately.

The broach unit or assembly, generally designated by the numeral 49, is shown separately in FIG. 5a. It comprises two spaced broach cutters 50 and 51, see FIG. 5b, each having plurality of teeth shaped to take progressively deeper cuts, with the last to cut tooth 50b determining the final configuration of the recess on a radius $R_2$. On the other hand, the first cutting tooth 50a cuts on a radius $R_1$.

As shown in FIG. 5b, cutter 51 is a construction similar to cutter 50 except for the direction of teeth with respect to its side face. For convenience of reference, the cutter 50 may be called the left-hand cutter and the cutter 51 the right-hand cutter, presuming that the observer looks at the workpiece of FIG. 6. Once in place and properly adjusted, cutters can be changed or removed for sharpening, and no gauging or readjustment of any kind is required when they are put back in place. Each cutter has a dovetail extension, such as 50e, in order to fit into the predetermingly spaced dovetail recesses of the broach holder, as shown in FIG. 5a, wherein they are secured with the aid of a dovetail clamp, as illustrated. Cutters are removable by loosening the two clamp screws 52. A stop block 54 is secured in place to the main cutter holder body 58 by screws 53 for the purpose of maintaining to desired tolerances the predetermined position of the cutting teeth of the broach cutters 50 and 51 consistent with and corresponding to the predetermined design of the recesses to be cut in the workpiece.

The broach unit or assembly operates as a single unit, and in operation is imparted successively two types of operative movements, oscillating movements to produce a cutting stroke and a return stroke, and straight-line movements to lower the cutters to start their cutting stroke, and to move the cutters upwardly at the end of their cutting stroke to clear the teeth of the workpiece for indexing.

Figure 4:
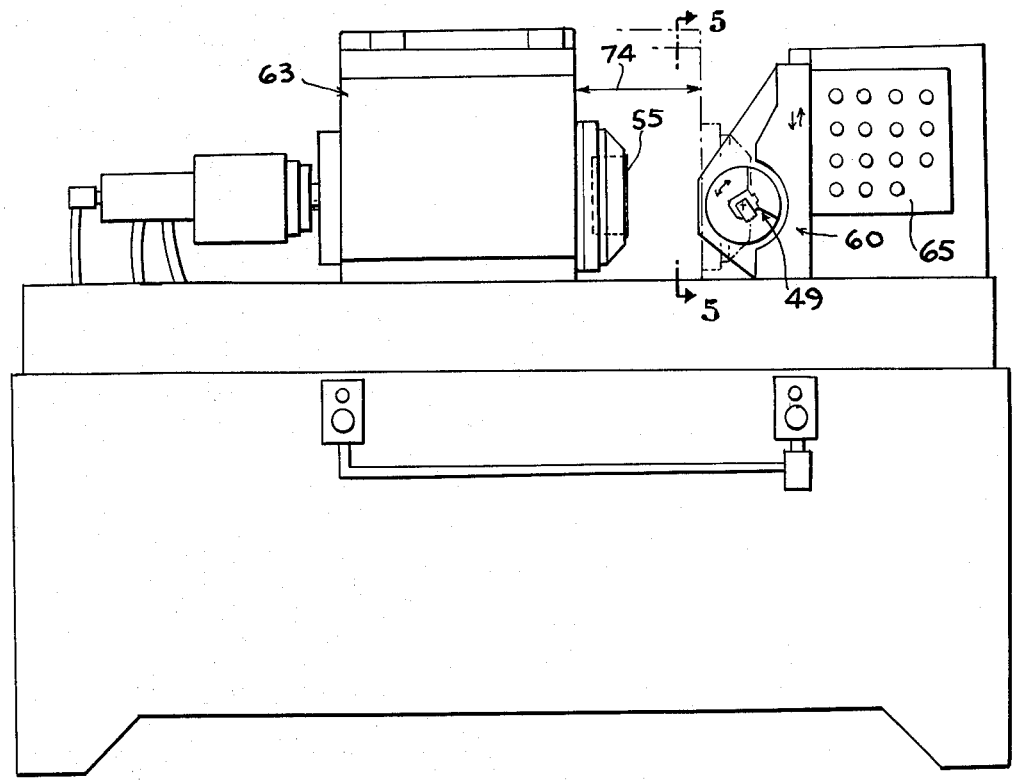
FIG. 4 is an elevational view of the machine constructed in accordance with the present invention, and showing the workpiece receiving means in their loading position.
Figure 14:
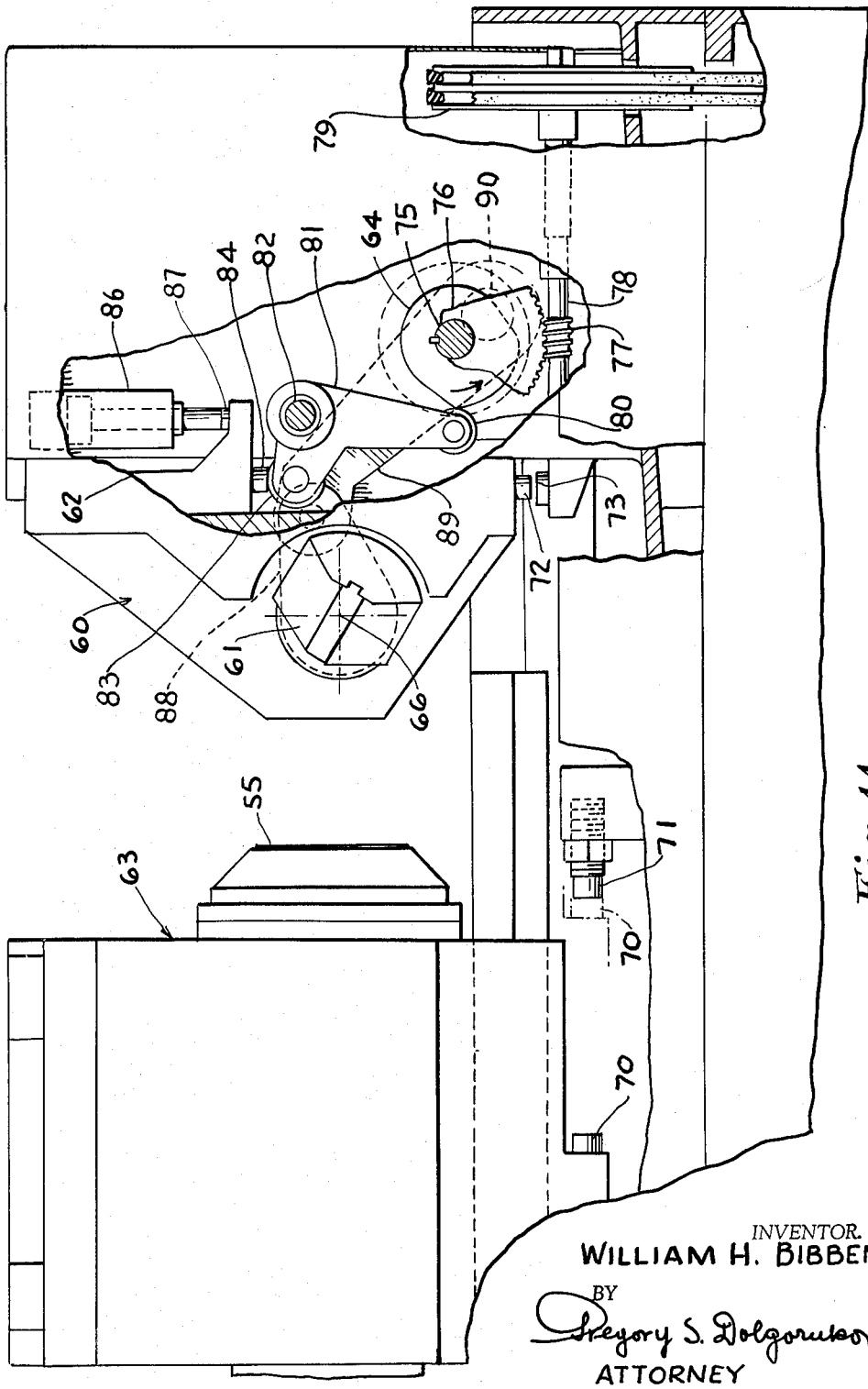
FIG. 14 is a view similar in part to FIG. 4 but illustrating the broach unit driving and control means in greater detail.

The workpiece 23 is manually loaded into a chuck or collet 44 when the machine is in condition illustrated in FIGS. 4 and 14. The collet 55 is adapted to receive and to hold the workpiece 23, locating it radially with the aid of external tooth pieces or radial locators 56 and axially with the aid of a suitable stop, such as 57, see FIGS. 6 and 11. When the collet 55 is contracted in a manner well known in the art, it holds the workpiece 23 firmly in place. Indexing means, which may be of any suitable type, are provided to index the collet and the workpiece 23 held therein. I prefer to have indexing means to begin their indexing operation as soon as the cutters 50 and 51 of the broach unit reach their uppermost position and clear the teeth of the workpiece, with indexing of the workpiece taking place while the cutters move on their return stroke. Thus, the time cycle of the cutter operation is greatly shortened and operation of the machine is speeded up.

Figure 8:
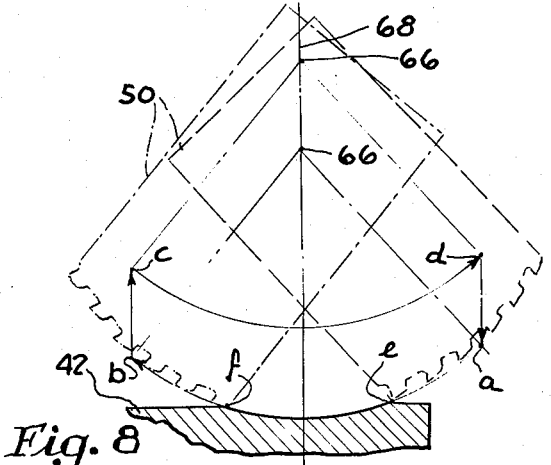
FIG. 8 is a view similar in part to FIG. 7 showing two extreme positions of the broach cutter at the beginning and at the end of its cutting movement, and indicating the cycle movement of one point on the broach cutter.

FIG. 8 illustrates the motion cycle of the broach unit cutters with reference to a single point on one of the cutters, such as cutter 50. The cutting stroke is represented in said figure by the arcuate line a–b, which in its middle portion coincides with the arcuate line e–f representing the cross sectional line of the arcuate recess cut during said cutting stroke a–b. The upward movement of the cutter is represented by the vertical line b–c indicating the clearing movement of the cutter. The curved line c–d represents the return stroke of the cutter during which indexing of the workpiece 23 takes place, as mentioned. The vertical line d–a represents the downward movement of the cutter, at the end of which the cutter arrives into the starting position to repeat the cycle.

Since two tooth working faces are operated upon during a single cutting stroke of the broach unit, the entire operation on the workpiece is completed in a number of strokes equal to the number of teeth in the workpiece 23.

Means operating to actuate the broach assembly 49 in the manner described above are exemplified in the present embodiment of the invention by a crank spindle assembly 60 having its offset or eccentric end 61 carrying the broach assembly 49 removably secured thereto in any suitable manner, such as with the aid of screws. The body of the spindle 61 is journalled in suitable bearings, preferably of the tappered roller type, for reversible rotation through a predetermined and adjustable angle to move the broach unit 49 through its cutting and return strokes, while the entire spindle assembly 60 is caused to move up at the end of the cutting stroke to move the broach assembly 49 up through its upward tooth-clearing stroke represented in FIG. 8 by the line b–c, and down at the end of its return stroke c–d, i.e. as indicated by the line d–a to bring it into the position to start again on its cutting stroke. The extent of the upward movement of the crank spindle assembly 60 is determined by a cam 64, while the lowermost position of the assembly 60 is determined by a stop 73.

FIG. 14 shows the crank assembly 60, with the broach unit 49 removed from its end for the purpose of clarity. In said FIG. 14 the side wall of the housing 62 is broken away to expose the crank assembly actuating means.

As shown in said FIG. 14, the cam 64 is mounted on a crank shaft 75 and is secured thereon for rotation therewith. The crank shaft 75 is driven by a worm gear 76 mounted on the said crank shaft 75 for rotation therewith. The worm gear 76 is, in turn, driven by a worm 77 provided on the main drive shaft 78. The shaft 78 is driven from an electric motor (not shown) through a double-grooved pulley 79.

The cam 64 is in operative contact with a follower roller 80 of a bell crank 81. As the cam 64 rotates, it causes oscillation of the bell crank 81 on the shaft 82. In consequence thereof a roller 83, carried by the other arm of the bell crank 81 and bearing on the pressure pad 84 secured to the crank spindle slide assembly 60, causes upward movement of the assembly 60 in the above-described time relation and in opposition to the pressurizing means, such as a cylinder means 86. As further rotation of the cam 64 causes the roller 83 move downwardly, the cylinder means 86 maintaining resilient pressure on the pressure pad 87 cause a downward movement of the spindle slide assembly 60 until the predetermined limit thereof, determined by the stop 73, is reached.

In time relation to the above-described up-and-down movements of the crank spindle slide assembly 60, causing corresponding bodily movements of the spindle 61 and of the broach unit 49 carried thereby, the rocking or reversing rotative movements of the spindle 61 are produced by linkage means. As illustrated, said linkage means comprise a crank arm 88 affixed to the spindle 61, and a connecting rod 89. Said connecting rod 89 has one of its ends hingedly connected to said crank arm 88, and its opposite end similarly connected to a crank throw 90. As the crank shaft 75 rotates, the connecting rod 89 operates to rock the crank arm 88 and to rotate reversibly the spindle 61 through a predetermined angle.

The collet or chuck assembly carrying the expanding and contracting collet 55 and the workpiece 23 is adapted to be moved toward and away from the broach assembly through the distance designated in FIG. 4 by the numeral 74. In FIGS. 4 and 14 said assembly and its actuating unit, generally designated by the numeral 63, are shown in the position away from the broach unit 49 for loading and unloading the workpiece 23 into the collet and removal of said workpiece therefrom.

The workpiece 23 is manually loaded into a collet-chuck asembly. A start button on the electric control panel 65 closes the electric circuit starting the operation cycle. The entire unit 63 and the collet assembly with the workpiece carried thereby are then moved toward the broach unit 49 until the broach unit 49 assumes the position shown in FIG. 9, in which the axis of oscillation 66 of the broach unit 49, and therefore of the end of the crank spindle assembly 60, coincides with the vertical plane in which lies the axis 67 of the arcuate recesses to be cut. Said vertical plane is represented in FIGS. 8–12 by the line 68. Movement of the unit 63 carrying the collet 55 is produced by any suitable means, mechanical such as lead screw, or hydraulic, such as a suitable hydraulic cylinder and piston. Stopping of the unit 63 in the precise position explained above is ensured by the contact boss 70 reaching the stop 71. The stop 70 is adjustable to position the axis of the cutters with respect to the workpiece.

When the unit 63 reaches its predetermined position determined as explained above and ensured by the stop 71, the crank spindle carrying unit 60 and the broach unit 49 carried thereby are moved downwardly to cause the axis of said broach unit 49 to move down into the position shown in FIG. 10 wherein the axis of oscillation 66 of the broach unit 49 coincides with the common axes of the recesses to be cut. Stopping of the crank spindle carrying unit 60 in such a position is ensured by the cooperation of the contact boss 72 carried by the unit 60 and the stop 73, see FIG. 14.

When the broach assembly 49 reaches its position shown in FIG. 10, the means oscillating the crank spindle assembly become operative and rotate the crank spindle and the broach unit through the angle A, cutting in the process of such movement the recess 25 in the tooth 22 of the workpiece 23, and arriving at the end of such limited rotary movement into the position shown in FIG. 11.

As the broach assembly reaches said position, the crank spindle carrying unit 60, together with the crank spindle, are moved upwardly to their raised position, bringing the broach unit 49 into the position shown in FIG. 12. In such position the axis 66 of the broach unit becomes disposed at a distance from the axis 67 of the cut recess 25, and the broach cutters 50 and 51 are raised sufficiently to clear the teeth of the workpiece for indexing.

Indexing means, which may be of any suitable character and which by themselves do not form a part of the present invention, become operative when the broach unit is so raised and index the workpiece 23. An indexing of the workpiece 23 proceeds, the crank spindle rotates to bring the broach unit back into position shown in FIG. 9. The crank spindle carrying unit 60 thereupon moves down, as described previously, and the broach unit is brought again into the position of FIG. 10 to repeat the cycle and to cut similar recesses in the next two spaced teeth, until completion of the recess cutting operation on the last pair of teeth of the workpiece.

At the end of the cutting operation on the last pair of teeth, the cutters stop in their retracted position and the collet carrying assembly 63 returns to its "load" position. Thus, except for manual loading and unloading of the workpiece, the entire operation on the workpiece is automatic. By virtue of the construction described above the operation is completed in a much shorter period of time than it would be possible otherwise. For example, the average time of completing the entire operation on a 36 tooth spline is approximately 30 seconds.

Figure 3:
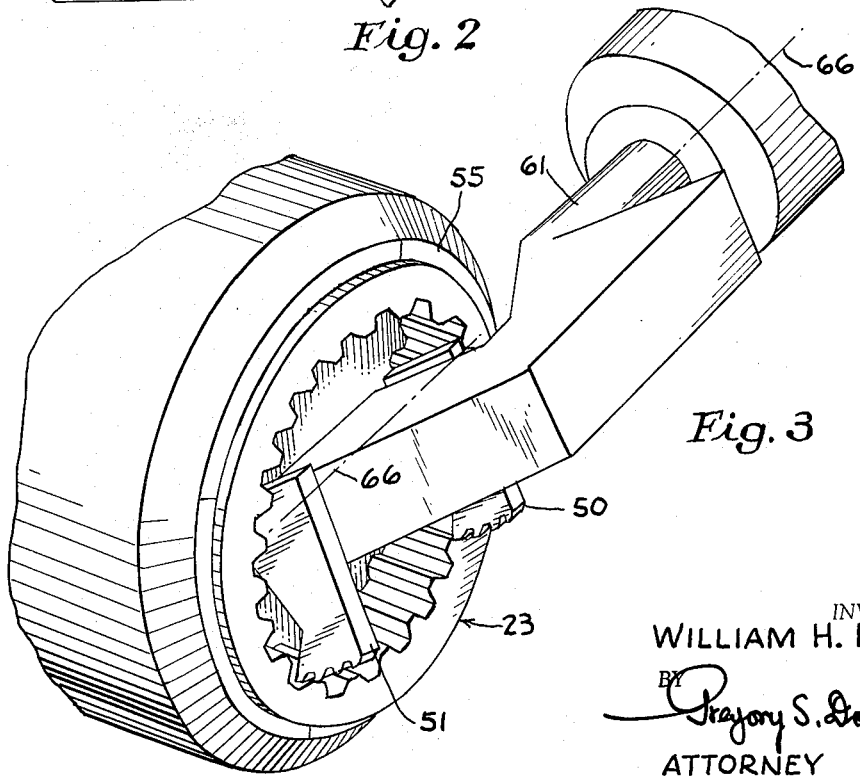
FIG. 3 is a perspective view illustrating in a simplified manner the broach unit in its operative position at the workpiece, and the nature of the crank spindle carrying said unit.

From an examination of FIGS. 9–12 it will be noted that the axis of oscillation 66 of the broach unit 49 remains during the entire cutting operation in the plane 68 which intersects the workpiece 23 and passes through the middle points and the axes of the cut recesses. In order to produce oscillation of the broach unit around an axis passing through said plain and constituting the axis of oscillation or reciprocal rotation through a relatively small angle, the crank spindle is constructed as illustrated diagrammatically in FIG. 3. As shown in said figure the end 61 of the spindle together with the broach unit form, in effect, a goose neck or hook crank reaching into the workpiece 23. It will be understood that showing of the FIG. 3 is intended for the purpose of clarity of explanation, and that the actual form of the construction of the crank spindle shown in other figures of the drawings varies somewhat from its representation in said FIG. 3.

It will be understood that while the present invention has been illustrated and described herein with reference to oscillating cutters of the broach type, use of the spaced rotating milling cutters as well as spaced grinding wheels may also be employed. In such constructions oscillating movements of the cutters or grinding wheels may be unnecessary, and the cutters or the grinding wheels are moved down and fed into the work with the axes of the cutters or the grinding wheels moving within the plane such as the plane 68, and are moved up in a similar manner to withdraw the cutters or the grinding wheels from positions of interference with the teeth of the workpiece for indexing the workpiece.

By virtue of the above disclosed construction, the objects of the present invention listed above and numerous additional advantages are attained.

I claim:

1. In a method of cutting arcuate recesses in the working faces of internal teeth of a toothed machine element having circularly arranged internal teeth, on both sides of each tooth, the steps of providing an oscillating broach unit having its radius of oscillation equal to the radius of arcuate recesses, and two broach cutters spaced and shaped to cut simultaneously recesses in the working faces of two spaced teeth, the faces of which in an end view are substantially parallel to a cord of the gear circle, which cord is substantially parallel to the axis of oscillation of the broach, disposing said broach unit within the workpiece to have its axis of oscillation coincide with the axes of the predetermined recesses to be cut, and oscillating said broach unit for cutting the recesses on said two teeth, and for returning the unit to the starting position.

2. The method defined in claim 1 and including the step of moving the broach unit up for clearing the teeth of the workpiece for indexing thereof, indexing the workpiece for one tooth, oscillating the broach unit in its raised position to produce a return stroke thereof, and lowering the broach unit into a position for repeating the cycle at least as many times as there are teeth in the workpiece to be provided with the recesses.

3. The method of cutting arcuate recesses in both working faces of internal teeth of a toothed machine element having circularly arranged internal teeth, said method comprising the steps of identifying two teeth on two opposite sides of the element workpiece, which teeth are in respective positions wherein their faces in a sectional view lie closest to one straight line, with perpendiculars to the ends of said line at the places of juncture of the lines representing the side working faces of the teeth and the root faces thereof clear the top edges of the adjacent teeth; providing an oscillating broach unit having radius of oscillation equal to the radius of arcuate recesses to be cut and having two spaced broach cutters, one on each of its two sides, said cutters formed to cut the recesses on said two teeth, disposing said broach unit in such space relation to the workpiece that its axis of oscillation substantially coincides with the axis of the recesses to be cut, oscillating said cutter to cut the recesses on two spaced teeth, moving the broach unit to clear the teeth of the workpiece, indexing the workpiece one tooth and oscillating the broach unit to produce the return stroke to bring said unit into its starting position for repeating the cycle for each tooth with the workpiece to be provided with said recesses.

4. The method of cutting arcuate recesses in both side working faces of internal teeth of a toothed machine element having circularly arranged internal teeth, said method comprising the steps of identifying in the machine element any pair of its spaced teeth, the axis of the arcuate recesses whereof would like on a substantially one straight line, providing an oscillating broach unit having radius of oscillation equal to the radius of arcuate recesses to be cut and having a broach cutter on each of its two sides with the teeth formed to cut the recesses on said two teeth, disposing said cutters in such space relation to the workpiece that their axes of oscillation substantially coincide with the axes of the recesses to be cut, oscillating said cutter to cut the recesses on two teeth and to withdraw the cutters from the position of interference with the workpiece teeth in indexing, and indexing the workpiece for one tooth after withdrawal of the cutters from the position of interference.

5. In an apparatus for cutting arcuate recesses in the side faces of internal teeth of a splined machine element having circularly arranged internal teeth, an oscillatable broach unit having two broach cutters, one on each of the two sides thereof, the cutter edge radius of oscillation being substantially equal to that of the recesses to be cut, the spacing and configuration of the cutting teeth of said broach unit corresponding to the cross sectional outline of the two spaced teeth the axis of the recesses of which lie substantially on the same straight line forming a chord of the teeth circle.

6. In an apparatus for cutting arcuate recesses in the sides of internal teeth of a toothed machine element having circularly arranged internal teeth, and oscillatable broach unit having a broach cutter on each one of its two sides, with the teeth of said two cutters being adapted to cut progressively deeper to produce two spaced arcuate recesses having their respective axes substantially coincide with the axis of oscillation of the broach unit, with the last cutting teeth of said cutters being spaced apart and shaped to cut arcuate recesses in the opposite faces of two internal teeth of a workpiece spaced at equal distances from the median line of the broach unit.

7. In an apparatus for cutting arcuate recesses in the side faces of internal teeth of a toothed machine element having circularly arranged internal teeth, the combination of collet means adapted to receive, locate and hold the machine element workpiece; an oscillating broach unit having a broach cutter on each of its two sides and adapted to be moved into the workpiece to have its median plane coincide with the axis of the workpiece and the axis of oscillation of the unit coincide with the axis of the two recesses to be cut in one stroke in two spaced teeth the outline of the side faces of which lie substantially along one straight line parallel to a chord of the teeth circle and which are reachable by the broach teeth without interference from the adjacent teeth, means to oscillate said broach unit through a predetermined angle to produce a cutting stroke and to return stroke of said cutters; and means to index the workpiece one tooth after each return stroke of said cutters.

8. In an apparatus for cutting arcuate recesses in the side working faces of internal teeth of a toothed machine element having circularly arranged internal teeth, the combination of collet means adapted to receive, locate and hold the machine element workpiece; an oscillatable broach unit having a broach cutter on each one of its two sides, with said unit adapted to be moved into the workpiece to have its medium plane coincide with the axis of the workpiece and the axis of oscillation of the unit coincide with the common axis of the two recesses to be cut in one stroke in two spaced teeth the outline of the faces of which lie substantially along one straight line parallel to a chord of the teeth circle and which are reachable by the broach cutters without interference from the adjacent teeth, means to oscillate said broach unit through a predetermined angle to produce a cutting stroke and a return stroke of said cutters, means to raise said broach unit, after completion of its cutting stroke, to clear the teeth of the workpiece for indexing of the broach unit, indexing means for indexing the workpiece one tooth after the teeth thereof are cleared by the broach cutters, and means to lower said broach unit at the end of its return stroke to the starting position for repeating the cycle.

9. The apparatus defined in the preceding claim 8, and including an oscillating spindle having one of its ends supported in a bearing and its opposite end carrying the broach unit, and a goose-neck crank provided between said two ends to clear the wall of the workpiece therebetween.

No references cited.

WILLIAM W. DYER, JR., *Primary Examiner.*

G. A. DOST, *Assistant Examiner.*